United States Patent [19]
Gentile et al.

[11] Patent Number: 5,656,372
[45] Date of Patent: Aug. 12, 1997

[54] APPARATUS FOR FORMING HOLLOW FIBERS AND SAID FIBERS

[75] Inventors: Frank T. Gentile, Warwick; Michael J. Lysaght, East Greenwich, both of R.I.; Nicholas F. Warner, Belmont, Mass.

[73] Assignee: Brown University Research Foundation, Inc., Providence, R.I.

[21] Appl. No.: 456,636

[22] Filed: Jun. 1, 1995

Related U.S. Application Data

[60] Division of Ser. No. 927,509, Sep. 17, 1992, Pat. No. 5,480,598, which is a continuation-in-part of Ser. No. 703,360, May 21, 1991, abandoned.

[51] Int. Cl.⁶ .............................. D07G 3/00; B01D 33/21; B01D 39/00; B01D 11/00
[52] U.S. Cl. .................... 428/376; 428/398; 210/500.23; 210/500.41; 210/645
[58] Field of Search ........................... 428/376, 398; 210/500.23, 500.41, 645

[56] References Cited

U.S. PATENT DOCUMENTS

| | | | |
|---|---|---|---|
| 3,871,950 | 3/1975 | Hashino et al. | 264/182 |
| 4,051,300 | 9/1977 | Klein et al. | 428/398 |
| 4,175,153 | 11/1979 | Dobo et al. | 428/398 |
| 4,401,567 | 8/1983 | Shindo et al. | 428/376 |
| 4,604,326 | 8/1986 | Manabe et al. | 428/398 |
| 4,654,265 | 3/1987 | Kamei et al. | 428/376 |
| 4,708,799 | 11/1987 | Gerlach et al. | 428/398 |
| 4,708,800 | 11/1987 | Ichikawa et al. | 428/376 |
| 4,749,619 | 6/1988 | Angleraud | 428/376 |
| 4,859,535 | 8/1989 | Shinamura et al. | 428/376 |
| 4,882,223 | 11/1989 | Aptet et al. | 428/398 |
| 4,900,626 | 2/1990 | Fabre | 428/376 |
| 4,906,375 | 3/1990 | Heilmann | 428/398 |
| 4,919,810 | 4/1990 | Itoh et al. | 428/376 |
| 4,992,332 | 2/1991 | Kamei et al. | 428/398 |
| 5,049,276 | 9/1991 | Sasaki et al. | 428/376 |
| 5,084,349 | 1/1992 | Sasaki | 428/398 |
| 5,240,614 | 8/1993 | Ofsthein et al. | 210/265 |

*Primary Examiner*—Newton Edwards
*Attorney, Agent, or Firm*—Ivor Elrifi; Bruce F. Jacobs; Diderico Van Eyl

[57] ABSTRACT

A nozzle assembly for forming hollow fibers, particularly a "Z-fiber" having longitudinally oriented trabeculae with the fiber wall, is disclosed. The nozzle assembly contains a replaceable nozzle cap, a replaceable seal-guide, and a retractable central bore used to supply core material for the hollow fibers. The Z-fibers are particularly useful in enabling cells, solutes, or the like, to enter the fiber wall and move longitudinally into the center of the fiber wall.

2 Claims, 6 Drawing Sheets

APPARATUS FOR FORMING HOLLOW FIBERS AND SAID FIBERS

This is a divisional of application Ser. No. 07/927,509 filed on Sep. 17, 1992, now U.S. Pat. No. 5,480,598 which is a continuation-in-part of U.S. Ser. No. 07/703,360, filed May 21, 1991, now abandoned.

BACKGROUND OF THE INVENTION

A hollow-fiber membrane is a hollow capillary tube in which the wall functions as a permeable, non-permeable, or semipermeable membrane depending upon the application. In many cases, hollow fibers are used as cylindrical membranes that permit selective exchange of materials across the walls. They may also be used as containers to effect the controlled release of a specific material or as reactors to chemically modify a permeant as it diffuses through a chemically activated hollow-fiber wall. Hollow fiber technology has recently become useful for the production of permselective, biocompatible immunoisolatory vehicles. These hollow fiber vehicles may contain materials such as living cells, proteins, or medicaments. They are designed so that material within the hollow fibers can permeate through the walls of hollow fiber vehicle. In use, the hollow fiber vehicles are delivered to a site specific in the body in need of the particular material present in the core of the hollow fiber. Specific applications for which such hollow fibers may be useful include restoration of insulin production and the treatment of neurotransmitter-deficiency diseases such as Parkinson's disease by delivery of a particular neurotransmitter to a site specific in the body. See, for example, U.S. Pat. No. 4,892,538.

No matter what the particular application of the hollow fiber vehicles, the morphology and thickness of the fiber membrane must be controlled to obtain the desired mechanical and transport properties suitable for the particular application.

There are four conventional synthetic-fiber spinning methods that may be used to produce hollow-fiber membranes: (1) melt spinning; (2) dry spinning; (3) wet spinning; and (4) a combination of dry and wet spinning. In each of these meth- ods, a tubular cross-section of the hollow fiber is formed by delivering a spinning material such as a polymer, copolymer, cellulosic material, or the like, through a spinneret nozzle while simultaneously delivering a material to be housed in the core of the fiber. Spinneret nozzle assemblies exist in a variety designs such as those shown in U.S. Pat. Nos. 4,035,459; 4,127,625; 4,229,154; 4,322,381; 4,323,627; 4,342,711; 4,380,520; and 4,744,932.

Some of the problems associated with these prior art nozzle assemblies and hollow fiber forming techniques include an inability to form fibers from highly viscous thermoplastic polymers due to nozzle clogging, an inability to adjust the nozzle assembly to produce varying membrane thicknesses and morphologies, an inability to change nozzle types or nozzle caps in the assembly so as to allow for the production of different types and shapes of hollow fibers, and an inability to produce Z-fibers having trabeculae oriented substantially longitudinally within the fiber wall and substantially interconnected with one another within the fiber wall.

U.S. Pat. No. 3,871,950 discloses hollow fiber membranes having a gradient of pore sizes on the outer or on the outer and inner surfaces. There are no interconnections between the porous regions along the long axis of the fiber. As such, the fiber is a succession of closed voids oriented along the long axis of the fiber. The membranes of the present invention, however, have a different morphology in which trabeculae within the fiber wall are substantially interconnected with one another and some or all thereof are continuous with the outside of the fiber.

General background information in the field of this invention may be found in U.S. Pat. No. 4,385,017, EP,A 0 277 619, and JP,A 57 106 708. Accordingly, it is an object of the present invention to produce a nozzle assembly that can be used with various materials having different and widely varying viscosities.

It is another object of the present invention to provide a nozzle assembly of modular construction wherein parts of the assembly can be easily replaced and substituted for, so as to facilitate the production of hollow fibers of different sizes, shapes, membrane thicknesses, and surface morphologies.

SUMMARY OF THE INVENTION

Accordingly, one aspect of the present invention is directed to a nozzle assembly for use in making hollow fibers which may be non-permeable, semi-permeable, or permeable. The fibers may be empty or, when semi-permeable or permeable, filled with a material such as a medicament or a biological material such as living cells or proteins. The nozzle assembly generally comprises a housing which contains an elongated bore or tube extending through the housing and a second outer bore or tube disposed concentric to the inner base. The inner bore is moveable and may be retracted and extended relative to the stationary outer bore and the housing in a manner which provides for precise and reproducible adjustment of the bore relative to both the extrusion cap and the housing. The output end of the outer bore is designed to be a removable nozzle cap and to contain a removable seal-guide for the inner bore which can be interchanged with other caps and seal-guides so as to allow for the production of hollow fibers of different shapes and having different membrane thicknesses and morphologies. The inner bore may also be interchangeable with other inner bores to change the central lumen diameter or fiber wall morphology. The nozzle assembly of the present invention is particularly useful in making hollow fibers which contain living cells or other biological materials.

In addition, the present invention is directed to a novel fiber structure referred to herein as a "Z-fiber." A Z-fiber contains trabeculae within the fiber wall and the trabeculae (i) are oriented substantially longitudinally with respect to each other, (ii) are substantially interconnected with one another within the fiber wall, and (iii) some or all are continuous with the outside of the fiber. In addition, a Z-fiber has a semipermeable inner skin which defines the fiber lumen and can be used to provide immunoisolatory function.

BRIEF DESCRIPTION OF THE DRAWINGS

FIG. 3b is an enlarged detail plan view in cross section of the outlet end of the nozzle cap and seal-guide of FIG. 3a.

FIG. 4 is a series of three photographs of a single Z-fiber membrane at different degrees of enlargement to better show the trabeculae and their longitudinal relationship.

DETAILED DESCRIPTION OF THE PREFERRED EMBODIMENTS

Figure 1:
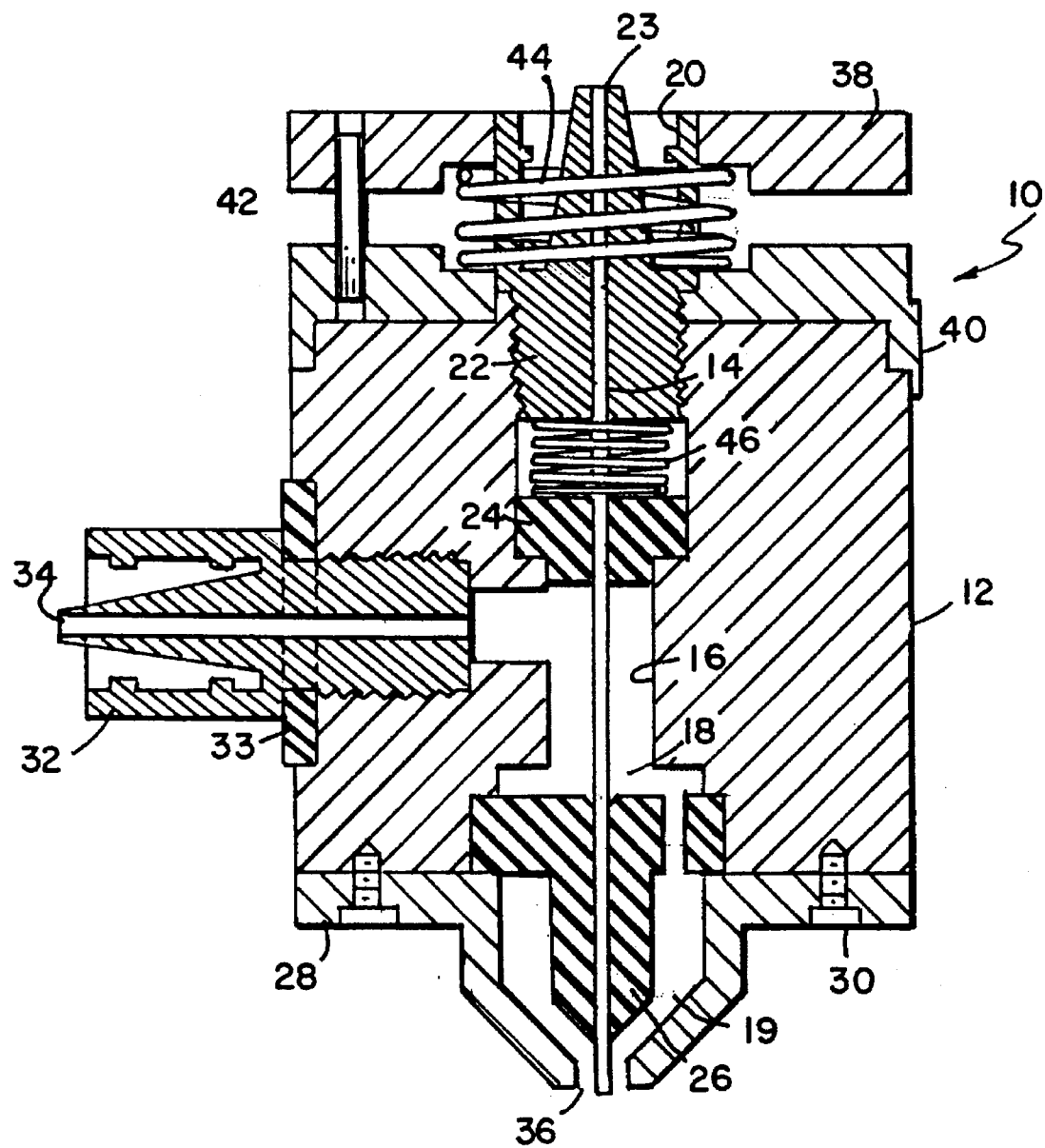
FIG. 1 is a plan view in cross section of a nozzle assembly of the present invention showing the inner bore fully extended.
Figure 2:
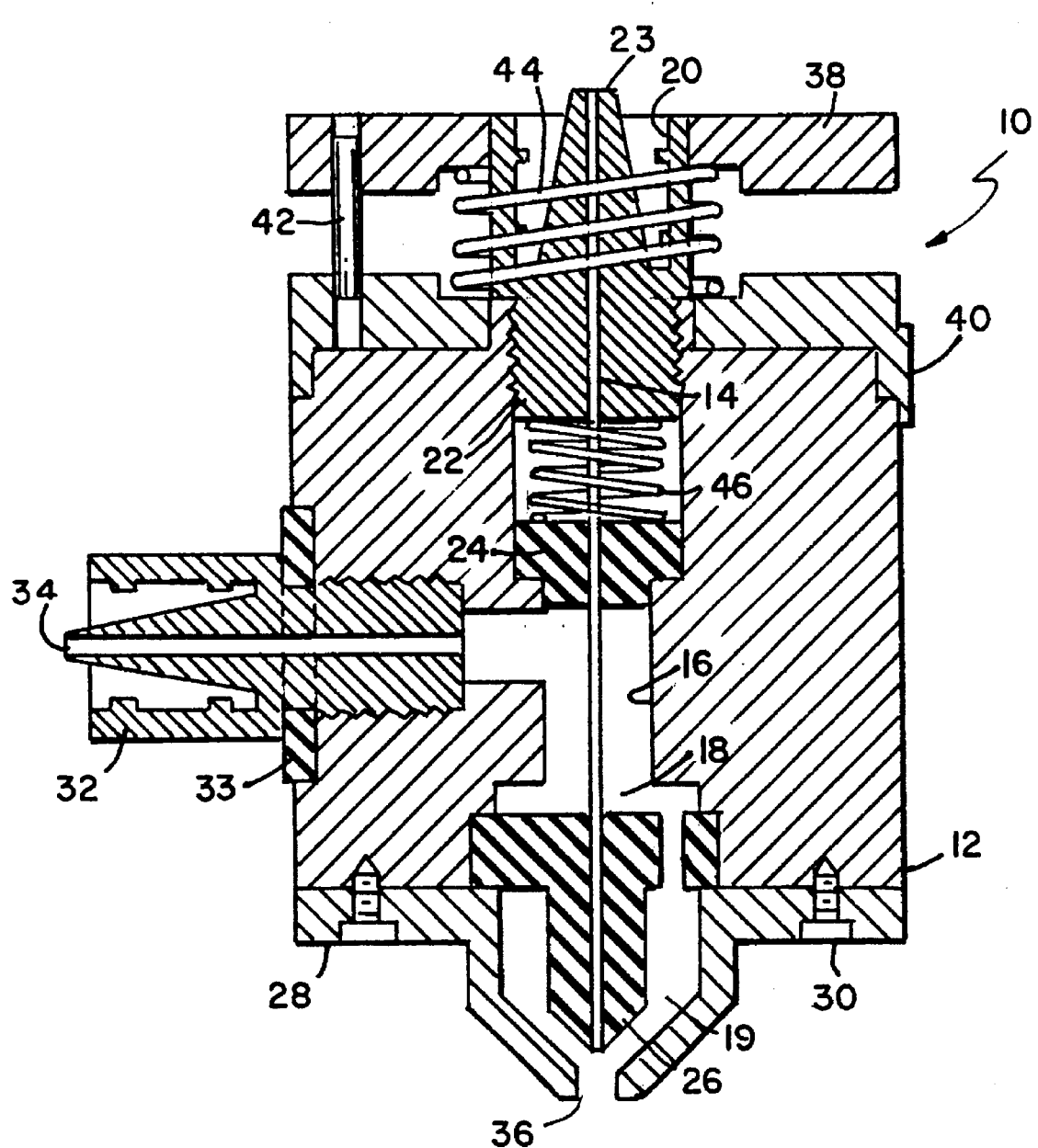
FIG. 2 is a plan view in cross section of a nozzle assembly of the present invention showing the inner bore retracted.

As best shown in the drawings, a nozzle assembly 10 accordingly to the present invention comprises a housing 12 made from a solvent resistant material. Within housing 12 is disposed an elongated hollow inner bore or tube 14. Also disposed within the housing 12 is an outer bore 16 which is concentric to the inner bore 14 so as to define an annular space or channel 18. The inner bore 14 extends through and is fixedly attached to a threaded fitting 20 which is screwed into the housing 12 containing matching screw threads in the upper portion 22 of the outer bore 16. Material for inclusion within the core hollow fiber membrane may be fed into the nozzle assembly at the input end 23 of the inner bore 14. Inner bore 14 also passes through a seal 24 which prevents fluid present in the channel 18 from flowing upwards and out of the top of the housing. The seal 24 is held in place by the spring 46. In the lower portion of the housing, the inner bore 14 passes through a seal-guide 26 which is removably attached to housing 12 by compressive force generated by the attachment of a nozzle cap 28. Seal-guide 26 maintains inner bore 14 in alignment during extension and retraction and it contains one or more holes therein to direct fluid present in the channel 18 to enter the outer regions of channel 19. The nozzle cap 28 is removably attached by means of fastening means 30 such as a screw, bolt or the like to the housing 12. It is designed to extend the channel 18 to the exit end 36 of the nozzle assembly. As shown, the contours of the bottom portion of seal-guide 26 and the nozzle cap 28 define the dimensions and path of channel 19. As shown in FIGS. 1 and 2, the channel 19 just prior to its intersection with bore 14 is at about a 45° angle. The outer bore 18 is connected to a source of fluid for use in making the hollow fiber membrane by means of fitting 32 such as a conventional luer fitting. As shown, the fitting 32 contain a tubular inlet 34 through which fluid flows into the nozzle assembly and into the channel 16. A seal 33 provides for a fluid-tight fit preventing any flow of fluid outward through the fitting. The extension and retraction of inner bore 14 is accomplished by rotation of inner bore adjustment means 38 which is attached to threaded fitting 20 to form a bore adjustment assembly which screws into or out of matching screw threads of the outer bore 16. The bore adjustment assembly rotates as a single unit and vertically moves inner bore 14 up or down, depending on the direction of rotation. A pin 42 is fixed on the inner bore adjustment means 38 as shown in FIG. 2 or (not shown) on the fitting 40 and extends therebetween and causes both to rotate together. Although the fitting 40 rotates in conjunction with the adjustment means 38, it remains seated in the vertical direction due to tension applied by the spring 44. The reproducibility of the extension or retraction between subsequent extrusions is improved by use of a measuring device such as a vernier scale affixed to the fitting 40. The extension and retraction may be performed manually or mechanically under computer control (not shown).

FIG. 1 shows a cross sectional plan view of the nozzle assembly with the inner bore 14 at an intermediate position between full retraction and full extension. FIG. 2 shows the inner bore 14 at full retraction.

All of the components of the nozzle assembly, including the housing, are made from organic solvent resistant materials such as stainless steel, glass, and Teflon®, Delrin®, or polypropylene polymers. The seals which must be compatible with and not deleteriously affected by the solvents utilized during the extrusion process are preferably made from Teflon, polymers, but may also be made from materials such as polypropylene, nitrile polymers, or the like.

In operation, a fluid used to form the hollow fiber membrane is forced by a pump (not shown) to flow into the outer bore 16 and channel 18 through fitting 32 and then into channel 19 through one or more holes through seal-guide 26. The type of fluid employed will, of course, depend upon the specific hollow fiber membrane that is desired. Suitable materials for use as the hollow fiber membrane include conventional membrane-forming materials such as thermoplastic polymers, thermosetting polymers, gels, and hydrogels. Specific materials that may be used include cellulose, acrylic copolymers, polyvinylidene fluoride, polyurethane isocyanates, alginates, polysulfones, polyvinyl alcohols, polyacrylonitriles, and mixtures thereof. Also, the material useful as core materials may be used to form the membranes. While the membrane forming material may be a melt, it is preferably a solution. Suitable solvents for use in forming the solution include water soluble organic solvents such as dimethylacetamide, dimethylformamide, acetone, dimethylsulfoxide, N-methylpyrolidone, acetonitrile, and mixtures thereof, as well as other solvents such as hexane, diethylether, methylene chloride, and mixtures thereof.

In most applications, although not in all, the hollow fibers formed using the device of the invention will contain a core material and/or a deliverable such as a medicament, a biological material such as living cells or proteins, or other similar materials dispersed therein. The core material and/or deliverable is generally in a fluid medium, generally water, to form a core material composition. The composition often includes one or more of crosslinking agents, gel formers, or viscosity enhancing substances. Other materials which may be present in the core material composition include such as Ficoll, saline, ethanol, tissue culture media, serum, and methanol. The core material composition may also include biocompatible hydrogels, which may be used to immobilize cells or provide growth substrata. Specific core materials may be anionic [alginate], cationic [collagen], amphoteric [poly(phosphazene) s optionally having ionic side chains], or neutral [poly(ethylene oxide)s]. The alginate may be in liquid form or crosslinked after extrusion by allowing $CaCl_2$ to diffuse into the liquid core. The core material composition is supplied through inner bore 14. The membrane material and the core material composition meet at or about the nozzle output end 36. When unfilled hollow fibers are to be formed, a fluid, e.g. water, a solvent, or a mixture thereof, is provided through inner bore 14. Thus the core material composition contains a fluid and optionally a core material, a deliverable, or both.

By adjusting the position of the inner bore 14 relative to the nozzle output end 36, clogging of channels 18 and 19 especially in the nozzle cap portion can be controlled and substantially eliminated. Clogging is a particular problem when the membrane forming material is a highly viscous or rapidly precipitating material such as a thermoplastic polymer in a solution. In certain instances during fiber membrane formation, it is desirable for the membrane forming material to be in contact with the core material composition as long as possible within the nozzle assembly and before the two materials exit the nozzle since an extended time has been found beneficial in controlling fluid flow orientation within the nozzle and in producing specific wall dimensions and fiber wall morphologies. As a result, it is often preferable to maintain the inner bore 14 in a substantially fully retracted position to permit prolonged contact before the two materials exit the nozzle assembly. Early and prolonged contact, however, causes clogging, especially in the nozzle cap because the fiber membrane forming material precipitates and hardens when it contacts the aqueous core material. This would normally slow the flow of material in channels 18 and 19 and cause clogging. The clogging, however, can be overcome with the device of the present invention by beginning the hollow fiber membrane forming process with the inner bore 14 extended so that the core material composition and the membrane forming material do not meet until they are both exiting the nozzle. Then the inner bore can be retracted, generally gradually, to increase the time during which the two materials are in contact before exiting the nozzle. Normally once phase inversion, i.e. transition from liquid to solid, begins at a specific flow rate, the flow will remain substantially constant even though there is prolonged contact between the materials. The flow rates of the two materials are maintained by external pumps (not shown). This technique for avoiding clogging is preferred over prior art techniques which employ polymer solvents such as dimethylsulfoxide (DMSO). In many applications, such as those involving the production of hollow fiber membranes for use within a human body to administer drugs or the like, solvents such as DMSO can not be used due to their toxicity.

Figure 3A:
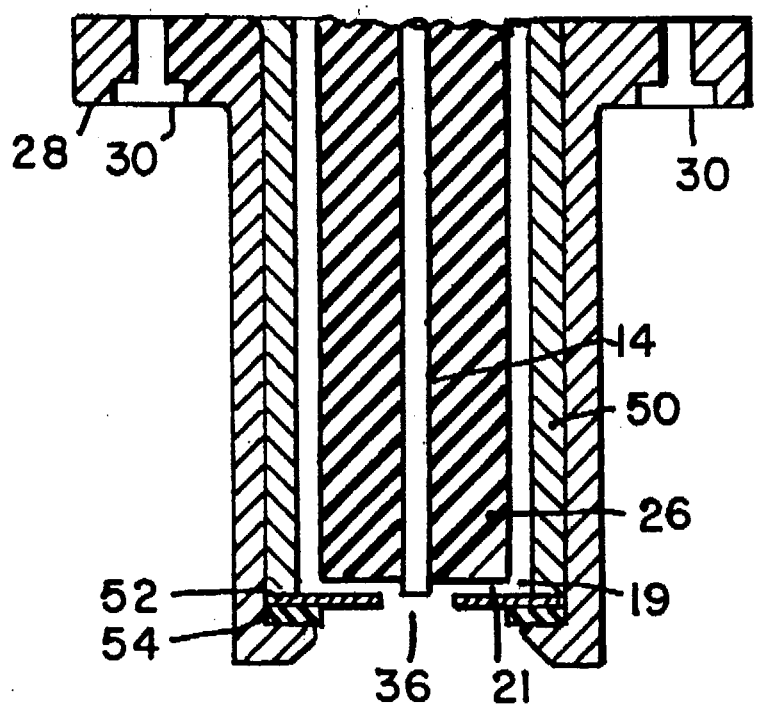
FIG. 3a is a plan view in cross section of a nozzle cap for use with the nozzle of FIG. 1 except with a different nozzle cap and seal-guide and further includes a partial plan view in cross-section of the bottom portion of a different seal-guide for the inner bore than in FIG. 1.
Figure 3B:
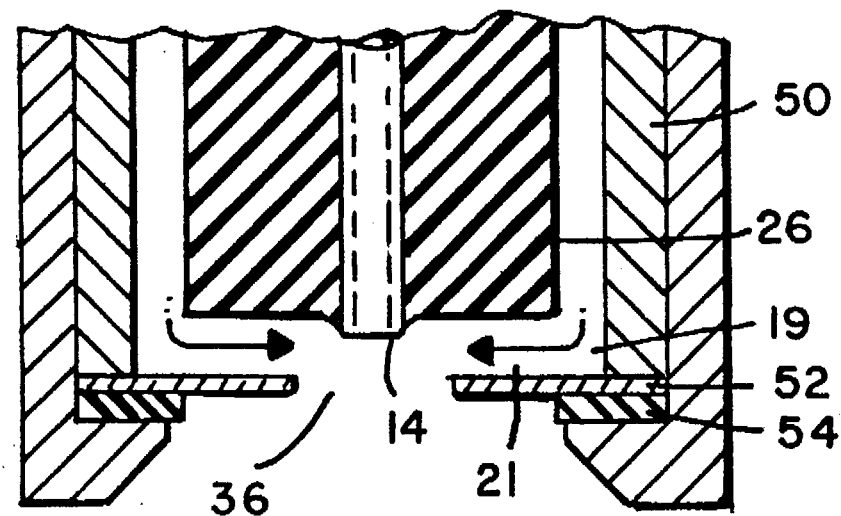

Another benefit of the device of the present invention is the use of the removable and replaceable nozzle cap 28 and seal-guide 26. By replacing the nozzle cap with other nozzle caps and/or seal-guide with other seal-guides the size and configuration of the annular channel can be altered near the output end of the assembly to change the resultant membrane. In addition, the direction of flow of the membrane forming material can be altered. For example, as shown in FIGS. 1 and 2, the direction of flow of the channel 18 in region 19 of the channel is at about a 45° angle in relation to the flow of material exiting inner bore 14. FIGS. 3a and 3b, on the other hand, shows a cap 28 and seal-guide 26 wherein the direction of flow in the portion 21 of channel 19 is 90° to the flow of material exiting inner bore 14. Various other nozzle caps and seal-guides providing other flow angles may be employed. By changing the angle at which the membrane forming material contacts the core material composition, the morphology of the membrane wall can be changed. Also, by changing the diameter of channel 19, especially in the portion of the channel in the nozzle cap 28, and/or the height 21, the thickness of the resulting membrane wall can be altered. The nozzle cap of FIGS. 3a and 3b further includes a sleeve 50 inside the nozzle cap housing 28 to narrow the diameter of channel 19, to facilitate the changing of orifice plate 52 to alter the opening size, or to affect the fiber size and/or morphology. The sleeve 50 also serves to transfer the force generated when the nozzle cap fastening means 30 are tightened into the housing 12. When the fastening means 30 are tightened, both the seal-guide 26 and a seal 54 located below the orifice plate 52 are compressed to attain an effective seal. The sleeve 50 terminates at orifice plate 52 which is generally held in place between sleeve 50 and seal 54 by compression, though it can be physically attached to the sleeve 50. The orifice plate 52 can change the direction, i.e. angle, of the flow of the membrane material and the outer diameter of the membrane formed.

The morphology of the fiber walls produced in anisotropic membranes and the formation of trabeculae therein is controllable by the nozzle of this invention. The formation of trabeculae is, in part, a phase separation phenomenon. In general terms, the polymer used to create the fiber wall is the most non-polar component of the total system while the solvent in which the polymer is generally dissolved is more polar than the polymer and is water-soluble. During extrusion, water or the water component of the core material composition in the inner bore comes in contact with the polymer/solvent fiber forming material when the two meet near the nozzle orifice. At this point, the water can diffuse into the polymer and the solvent/polymer/water mixture then partitions into solvent/polymer and solvent/water phases. The solvent/water phase creates a void in the polymer. The sum total of these voids results in a trabecular network within the fiber wall.

Normally the trabeculae of hollow fibers are oriented perpendicular to the fiber wall as occurs when a 45° cap (as shown in FIGS. 1 and 2) is used. A number of factors, such as the relative flow rates of the two materials, can be varied which can alter the orientation of the trabeculae. The present nozzle provides additional means for altering and controlling the trabecular morphology. When a 90° cap and seal-guide (as in FIG. 3) are used, they direct the flow path of the polymer perpendicular to the flow from the inner bore so that, presumably, void formation begins while flow is oriented in this direction. Then the sudden 90° change of direction distorts the shape of the incipient trabeculae to an angle oblique or parallel to the fiber wall, thereby forming fibers which are referred to herein as "Z-fibers".

Z-fibers contain trabeculae within the fiber wall which trabeculae (i) are oriented substantially longitudinally with respect to each other, (ii) are substantially interconnected with one another within the fiber wall, and (iii) some or all are continuous with the outside of the fiber. In addition, a Z-fiber has a semipermeable inner skin which defines the fiber lumen and provides immunoisolatory function. Z-fibers are believed to be more beneficial than other fiber morphologies at inducing and enhancing capillary in-growth into the fiber walls when the fibers are used as implant devices in living animals. The Z-fiber morphology has not been found to be dependent upon the chemical composition of the membrane, the dimensions thereof, nor the composition flowing through the inner bore.

The present nozzle also generally increases the uniformity of the resultant hollow fibers since traditional non-retractable coaxial nozzles tend to have substantial free play in the center bore which makes them sensitive to flow irregularities in the materials in the outer bore. This sensitivity is manifested by movement of the central bore which, during the extrusion process, leads to the production of irregular, asymmetric fibers. The seal-guide 26 in the present nozzle, due to its location close to the orifice of the inner bore, minimizes free play of the center bore and thereby leads to more uniform fiber preparation. Also, the seal-guide 26 reduces the need for frequent recentering of the inner bore and allows retraction and extension of the inner bore without change in bias and concentricity.

The fibers prepared using the nozzle of the present invention may be non-permeable, permeable, or semipermeable. Preferably, they are semi-permeable fibers which are useful as or in filtration devices, bioreactors, or as cell encapsulation vehicles.

EXAMPLE

The following example demonstrates the formation of an unfilled Z-fiber.

The nozzle assembly of FIG. 3 was utilized with a 90° cap and seal-guide. This assembly directs the flow path of the membrane-forming polymer perpendicular to the flow from the inner bore. The fiber membrane was prepared from a casting solution of 12.5% w/w poly(acrylonitrile-vinyl chloride) copolymer in dimethylsulfoxide. The inner bore contained distilled water. The casting solution was pumped at a rate of 1 ml/min and the water at a rate of 5 ml/min. The nozzle was maintained at a distance of 7 cm above a precipitation bath containing 10 liters of distilled water at ambient temperature and pressure. The inner bore was positioned at a distance of about 0.5 to 3 mm, preferably about 1 mm, above the outer tip of the nozzle. The two solutions were then pumped concurrently through the hollow fiber nozzle assembly and the resulting hollow fiber was collected in the precipitation bath.

Figure 4A:
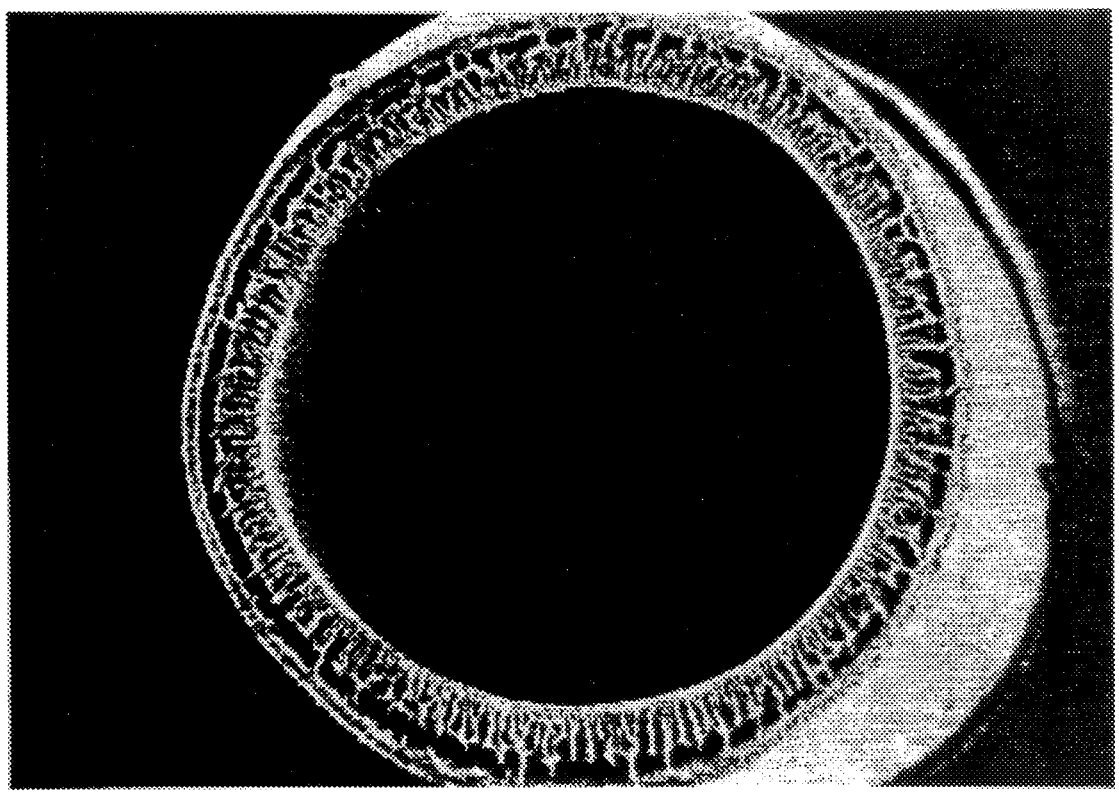
FIG. 4A is enlarged at about 100 X.
Figure 4B:
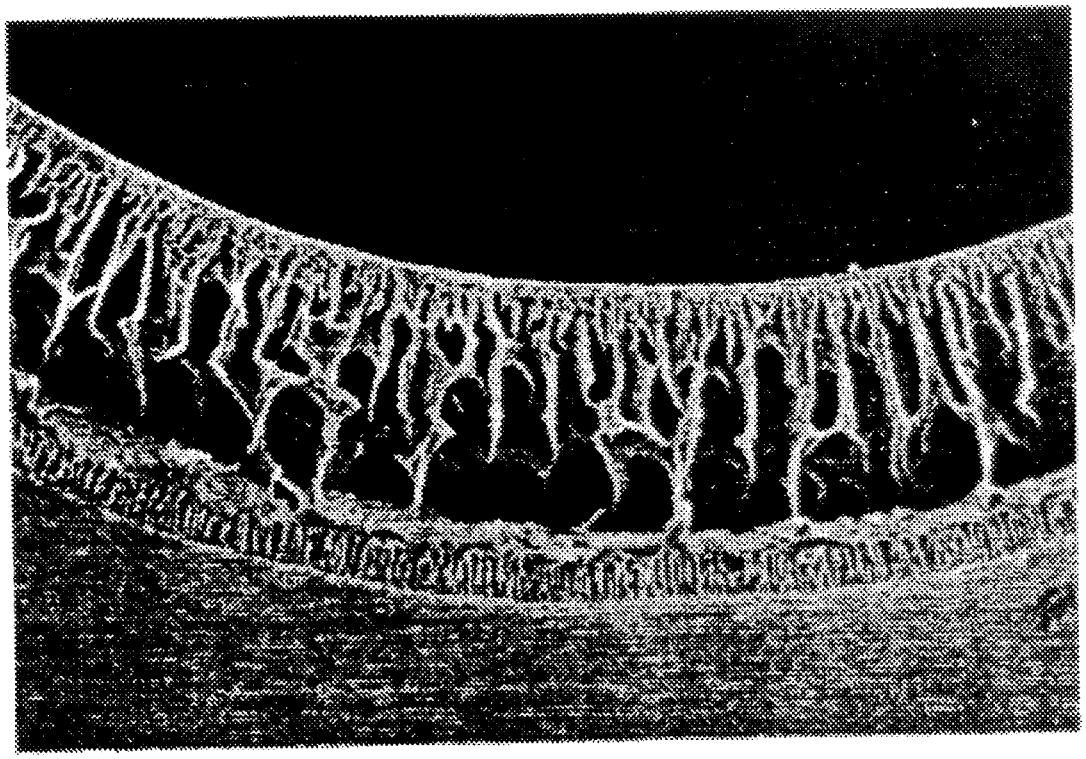
FIG. 4B is enlarged at about 200 X.
Figure 4C:
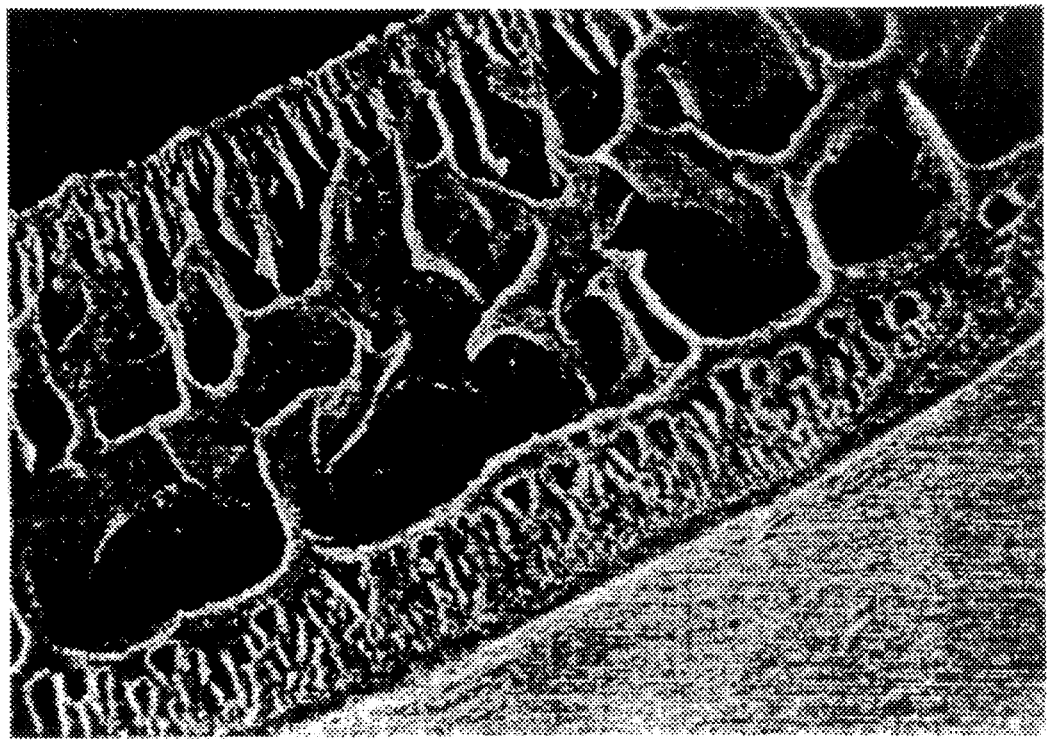
FIG. 4C is enlarged at about 500 X.

The resulting fiber exhibited the followed dimensions: 1,000–1,200 micron outer diameter and 80–100 micron membrane wall thickness. FIG. 4 is a set of three scanning electron micrographs at various magnifications which show the longitudinal trabecular orientation of the resultant Z-fiber.

Although the resulting Z-fiber can be hand-loaded with cells for use in inducing and enhancing capillary in-growth into the fiber walls, an easier technique for accomplishing the same result is by replacing the distilled water pumped through the inner bore with cells in suitable aqueous growth media and crimping the fiber membrane shortly after commencement of its formation.

What is claimed is:

1. A hollow fiber membrane which comprises (a) a semipermeable inner skin which defines a fiber lumen, (b) a fiber wall containing trabeculae oriented substantially longitudinally therein, wherein the trabeculae are oblique or parallel to the fiber wall, and (c) an outer surface, wherein at least some of the trabeculae are interconnected with one another within the fiber wall and at least some are continuous with the outer surface of the membrane.

2. The membrane of claim 1, wherein there are living cells in the lumen.

* * * * *